Patented June 17, 1941

2,246,222

UNITED STATES PATENT OFFICE 2,246,222

BATTERY PLATE BINDER

Clarence A. Rodgers, Indianapolis, Ind.

No Drawing. Application March 8, 1939,
Serial No. 260,557

2 Claims. (Cl. 136—26)

This invention relates to compositions for use in pastes employed in forming lead plates for the usual type of sulphuric-acid-electrolyte secondary or storage batteries. One of the great difficulties encountered in the operation of such batteries is that the life thereof is shortened by reason of the active material in the positive plates dropping out from the plate grids before it is used up in the chemical reactions and forming sediment in the bottom of the battery.

This invention relates to a composition or mixture of materials which have been found to greatly extend the life of the plates of batteries of the type indicated through a very simple expedient of employing to a large extent at least for such materials the paste taken from the plates of used and discarded batteries. The new plates are made from the old battery materials.

Not only does the composition give a greatly prolonged life as compared to the usually formed battery plates but the new plates embodying this new composition are produced at far less cost.

In forming the composition, positive plates of the old storage batteries are initially dried. The dried paste or filler of these plates is removed in any suitable manner such as by a tumbling machine and the removed material in the form of a powder (old plate grids being separated out) is heated in an iron container to a rather high degree, such as around seven hundred to eight hundred degrees Fahrenheit. The powder coming from the positive plates consists largely of lead peroxide ($PbO_2$) and some lead sulphate ($PbSO_4$). Sediment from the bottom of the old battery cells is not used.

When this powder is heated, oxygen is driven off from the lead peroxide to change it to lead monoxide ($PbO$). The oxygen liberated combines to some extent at least with the iron of the powder-containing vessel to form iron oxide. Of course, iron oxide may be introduced into the mixture in any other suitable manner, the essential feature being that the lead peroxide be changed to lead oxide and a relatively small amount of iron oxide introduced, approximately .35% by weight.

The resultant mixture containing lead, iron, oxygen, sulphur, and possibly some antimony coming from the plate grids, is employed as a paste binder.

For the new positive plate paste I employ the spongy lead taken from the negative plates of the old batteries together with lead peroxide taken from the old positive plates and mix these two materials with the binding agent as above obtained and described. For the new negative plate mixture, the same materials are employed, that is, binding agent, spongy lead of the negative plate, and lead oxide of the old positive plate. However, the proportions are varied of these three materials as between the mixture for the positive plate and the mixture for the negative plate. In general, more spongy lead from the old negative plate is employed in the new negative plate mixture than in the new positive plate mixture. The exact proportions may vary in both mixtures. One particular range of proportions by volume is as follows:

New positive plate mixture:

| | Parts |
|---|---|
| Binding agent | 3 |
| Old positive plate lead peroxide | 5 |
| Spongy lead from old negative late | 4 |

New negative plate mixture:

| | Parts |
|---|---|
| Binding agent | 3 |
| Lead peroxide from old positive plate | 2 |
| Spongy lead from old negative plate | 7 |

I claim:

1. A binding agent for lead plate secondary batteries which consists of the paste from used positive plates plus iron oxide in a relatively small quantity on the order of approximately .35% by weight.

2. A binding agent for lead plate secondary batteries which comprises lead monoxide and approximately .35% by weight of iron oxide.

CLARENCE A. RODGERS.